United States Patent [19]

Witlin et al.

[11] Patent Number: 5,280,344
[45] Date of Patent: Jan. 18, 1994

[54] METHOD AND MEANS FOR ADDING AN EXTRA DIMENSION TO SENSOR PROCESSED RASTER DATA USING COLOR ENCODING

[75] Inventors: Michael N. Witlin, Reston; Duane A. Bresson, Warrenton; Michael J. Buehler, Manassas; Richard J. Buratti, Haymarket; Orion E. Kline, III, Sterling; Kenneth A. Rhrer, Fairfax; Jose Rio, Manassas, all of Va.

[73] Assignee: International Business Machines Corporation, Armonk, N.Y.

[21] Appl. No.: 876,886

[22] Filed: Apr. 30, 1992

[51] Int. Cl.$^5$ ............................................. H04N 9/74
[52] U.S. Cl. ..................... 358/21 R; 358/22; 358/110; 345/22
[58] Field of Search ............... 358/22, 80, 28, 27, 358/113, 112, 21 R, 110; 340/703; H04N 9/74

[56] References Cited

U.S. PATENT DOCUMENTS

| | | | |
|---|---|---|---|
| 3,069,654 | 12/1962 | Hough | 340/146.3 |
| 4,148,184 | 4/1979 | Giddings et al. | 358/81 |
| 4,220,965 | 9/1980 | Heitmann et al. | 358/22 |
| 4,225,861 | 9/1980 | Langdon et al. | 340/703 |
| 4,364,085 | 12/1982 | Dalke | 358/81 |
| 4,679,072 | 7/1987 | Takayama | 358/27 |
| 4,727,434 | 2/1988 | Kawamura | 358/80 |
| 4,763,186 | 8/1988 | Belmares-Sarabia et al. | 358/27 |
| 4,812,903 | 3/1989 | Wagensonner | 358/80 |
| 4,821,086 | 4/1989 | McNeely et al. | 358/22 |
| 4,827,942 | 5/1989 | Lipschutz | 358/112 |
| 4,839,718 | 6/1989 | Hemsky et al. | 358/22 |
| 4,866,511 | 9/1989 | Belmares-Sarabia et al. | 358/27 |
| 4,949,165 | 8/1990 | Reimann et al. | 358/10 |
| 4,985,756 | 1/1991 | Kawabe et al. | 358/22 |
| 5,040,225 | 8/1991 | Gouge | 358/112 |
| 5,051,929 | 9/1991 | Tutt et al. | 340/703 |
| 5,060,060 | 10/1991 | Udagawa et al. | 358/22 |
| 5,089,882 | 2/1992 | Kaye et al. | 358/28 |
| 5,107,333 | 4/1992 | Poque et al. | 358/113 |
| 5,204,665 | 4/1993 | Bollman et al. | 358/80 |

OTHER PUBLICATIONS

S. R. Deans, The Radon Transform and Some of Its Applications, pp. 106-107, 1937.
D. H. Ballard, Computer Vision, pp. 123-131, 1982.
R. J. Buratti, et al., "Use of Multicolor Displays for Sonar Detecton," *Proceedings of the NATO ANSI on Underwater Acoustic Data Processing*, Y. T. Chan (ed.), pp. 539-544, 1989.

Primary Examiner—James J. Groody
Assistant Examiner—Jeffrey S. Murrell
Attorney, Agent, or Firm—Mark A. Wurm

[57] ABSTRACT

Many sensor information processing applications currently use monochrome B-scan presentations to exhibit processing results from radar, sonar, spectral estimation, seismic profiling, radio astronomy, bio-engineering, and infrared imaging. The use of color for such raster display presentations have been limited to the coding of amplitude values for a fixed set of hue/luminance colors to convey recognition by the human operator. Hue and luminance are used here independently to convey two orthogonal pieces of low signal-to-noise sensor information simultaneously to the operator for quick and accurate recognition. The net result is an added degree of freedom available on a single display surface, which not only improves operator recognition and reaction time for critical events, but precludes the necessity of a second display presentation for the alternate information and subsequent correlation of two data sets by visual comparison. This invention discloses a system to generate and add a new color dimension, a fourth orthogonal axis to the presented data, in addition to position and luminance levels of a video display. The process adds information independent of the usual gray scale as saturated colors on a monotonic wavelength scale from red to green to blue.

6 Claims, 5 Drawing Sheets

FIG. 5

COLOR DEFINITION FOR THE 64 COLOR DISPLAY

| | HUES AT MAXIMUM LUMINANCE LEVELS $A(i) = [1 \times 8]$ | | | ATTENUATION VALUES $B(j) = [1 \times 8]$ |
|---|---|---|---|---|
| INDEX | RED | GREEN | BLUE | |
| 1 | 0.00 | 0.72 | 1.00 | 1.00 |
| 2 | 0.00 | 0.76 | 0.84 | 0.84 |
| 3 | 0.00 | 0.79 | 0.71 | 0.71 |
| 4 | 0.00 | 0.85 | 0.00 | 0.59 |
| 5 | 0.59 | 0.73 | 0.00 | 0.50 |
| 6 | 0.71 | 0.68 | 0.00 | 0.42 |
| 7 | 0.84 | 0.60 | 0.00 | 0.35 |
| 8 | 1.00 | 0.45 | 0.00 | 0.00 |

NOTES: 1. COLORS, $C(i,j) = A(i) \times B(j)$
2. ALL COLOR VALUES NORMALIZED

METHOD AND MEANS FOR ADDING AN EXTRA DIMENSION TO SENSOR PROCESSED RASTER DATA USING COLOR ENCODING

BACKGROUND OF THE INVENTION

1. Technical Field

The invention disclosed broadly relates to raster scanned display presentations of sensor processed data and more particularly relates to a method and apparatus for adding an additional degree of freedom, namely additional information as a hue encoding to an original monochrome presentation.

2. Background Art

Many sensor information processing applications currently use monochrome B-scan presentations to exhibit processing results from radar, sonar, spectral estimation, seismic profiling, radio astronomy, bio-engineering, and infrared imaging. The use of color for such raster display presentations has been limited to the encoding of amplitude values from a fixed set of hue/luminance colors to convey recognition by a human operator.

For some applications, processing for an additional dimension, hue, comes as a standard part of the system signal processing. Doppler for radar and sonar are such applications. In these displays X and Y are usually range and bearing respectively. On the luminance or Z axis, brightness is a relative signal level. A brighter spot indicates the presence of a strong reflector. Doppler processing done independently for each range and bearing cell can be color encoded so that the hue of the bright spot indicates movement or the lack of movement of the reflector towards or away from the source, and the approximate speed of the reflector. This additional information comes from sensor data in real-time or can be stored in a ROM as described in U.S. Pat. No. 4,364,085 to Dalke.

Generation of an orthogonal color or hue dimension for other applications is not as obvious. The presence of a color processor can aid in developing such data in real-time directly by image processing of the monochrome information when normal system processing does not. For example, a useful and orthogonal luminance axis for an infrared presentation can be temperature gradient where the hue axis is left as the temperature level. The image would then indicate directly current temperature, as well as the heating or cooling trend. The image processing to obtain the gradient can be implemented in a color processor by comparison to prior images on a pixel-by-pixel basis. Similarly, the color processor can be used to provide additional information on a moving infrared, acoustic (passive sonar) or electromagnetic source by doing a Hough transform (reference U.S. Pat. No. 3,069,654 to Hough, December 1962) on multiple trajectory hypotheses.

In displays having low signal-to-noise information, the presentations to a sonar or radar operator provides signals that are hard to recognize and the time required for the recognition is long. A significant amount of time and effort is required in operator training to use the display presentations. What is needed is a method and apparatus for adding an additional degree of freedom, additional information as a hue encoding to an original monochrome presentation to allow easy and quick recognition by an operator of target information.

OBJECTS OF THE INVENTION

It is therefore an object of the invention to provide an additional degree of freedom in the presentation of raster scanned data.

It is a further object of the invention to preserve the basic appearance of the raster scanned graphic presentation while adding additional information.

It is yet a further object of the invention to compensate for the normal visual sensitivity of the human eye in viewing CRT monitor characteristics.

It is still a further object of the invention to provide only saturated colors in a monotonic wavelength progression along the hue axis.

It is an advantage of the invention to improve the speed of recognition of targets presented on a CRT monitor.

It is an additional advantage of this invention to present an extra dimension on a CRT without the need for an additional presentation on a separate CRT monitor.

SUMMARY OF THE INVENTION

These and other objects, features and advantages of the invention are accomplished by the use of hue and luminance independently to convey two orthogonal pieces of low signal-to-noise sensor information simultaneously to an operator. The result is an added degree of freedom available on a single display surface which not only improves operator recognition and reaction time for critical events, but precludes the necessity of a second display presentation for alternate information and subsequent correlation of two data sets by visual comparison.

The present invention defines a method and system to generate and add a new color dimension, a fourth orthogonal axis, W, to the presented data in addition to the X-Y axes of the display plane and the Z axis of the luminance or "gray scale" axis. The process adds information independent of the usual Z axis data, as saturated colors on a monotonic wavelength scale from red to green to blue. The invention receives sensor inputs, generates a hue value for the received inputs and generates a luminance value for the received inputs. A lookup table is used so that data can be provided at a level necessary for proper hue and color perception by an operator for each pixel on a video display. The digital data signals are converted to an analog signal and the resultant enhanced signal is displayed on a video monitor.

BRIEF DESCRIPTION OF THE DRAWINGS

FIG. 5 is a color definition look-up table for hue luminance.

DESCRIPTION OF THE PREFERRED EMBODIMENT

Figure 1:
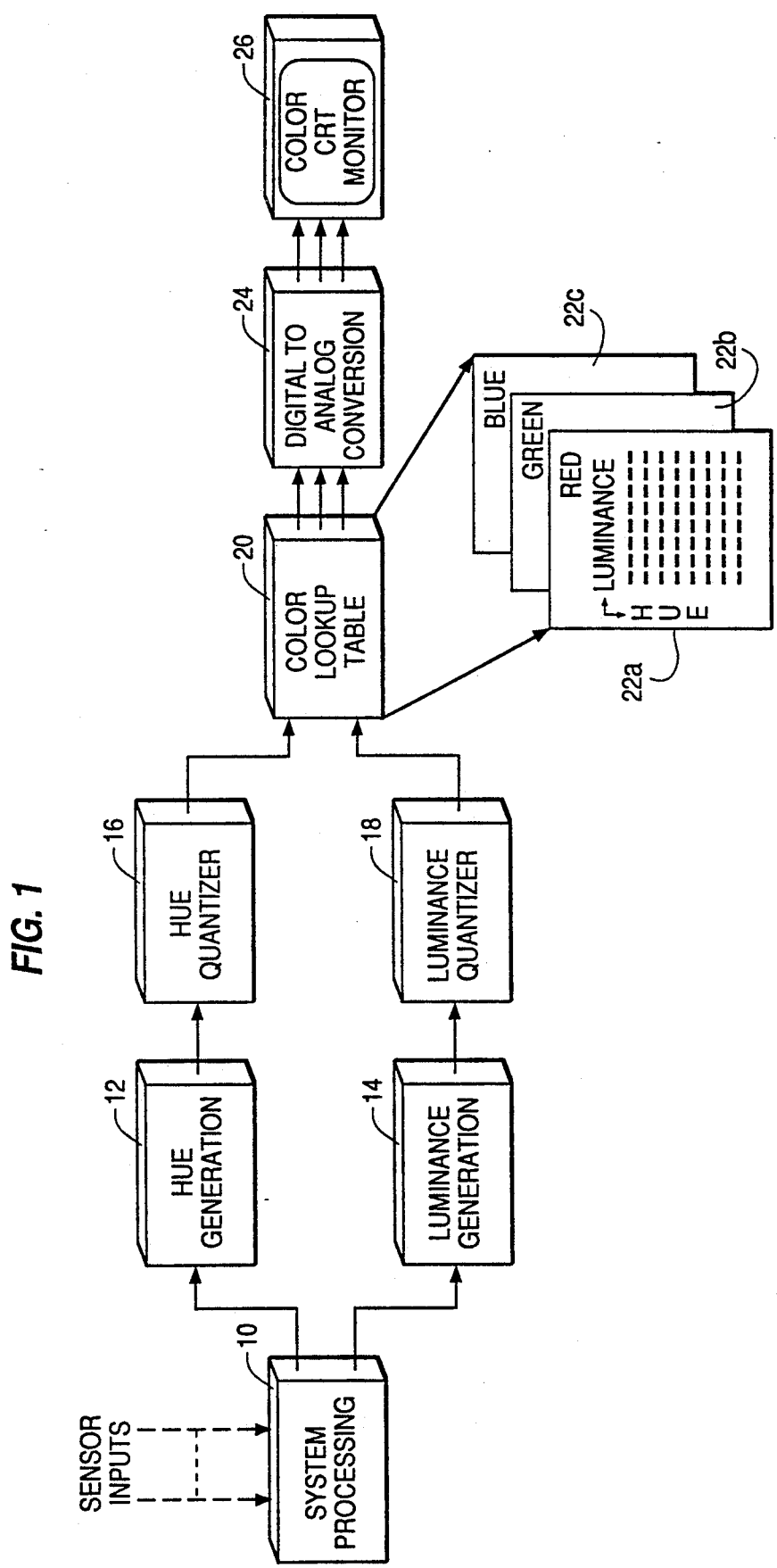
FIG. 1 is a block diagram of a system capable of adding an additional color dimension in real-time to the incoming sensor data.

The system diagram showing the preferred embodiment is illustrated in FIG. 1. A system processor 10 is used to produce separate information for control of hue and luminance. Hue generation is shown by block 12 and luminance generation by block 14. The hue information is quantized in block 16 and the luminance is quantized in digital format in block 18. The outputs of the hue quantizer 16 and the luminance quantizer 18 are input to a color lookup table 20. The rows of the color lookup provide monotonically varying luminance levels at constant hue. The columns of the color lookup table provide monotonically varying hues, that is varying wavelength, at constant luminance, and is used to define the color, the hue and luminance, of each pixel. This feature is shown in 22A, 22B and 22C which are the hue and luminance levels for red, green and blue, respectively. The luminance level selects the column and the hue level selects the row for each of the three primary color guns. These table entries include compensation for the monitor characteristics and human color perception, so that the apparent luminance of a pixel appears constant for colors of different hues for a constant luminance input. The results of the lookup table are fed to a digital-to-analog converter 24. The analog signal is displayed on color monitor 26 as a standard video display.

Figure 2:
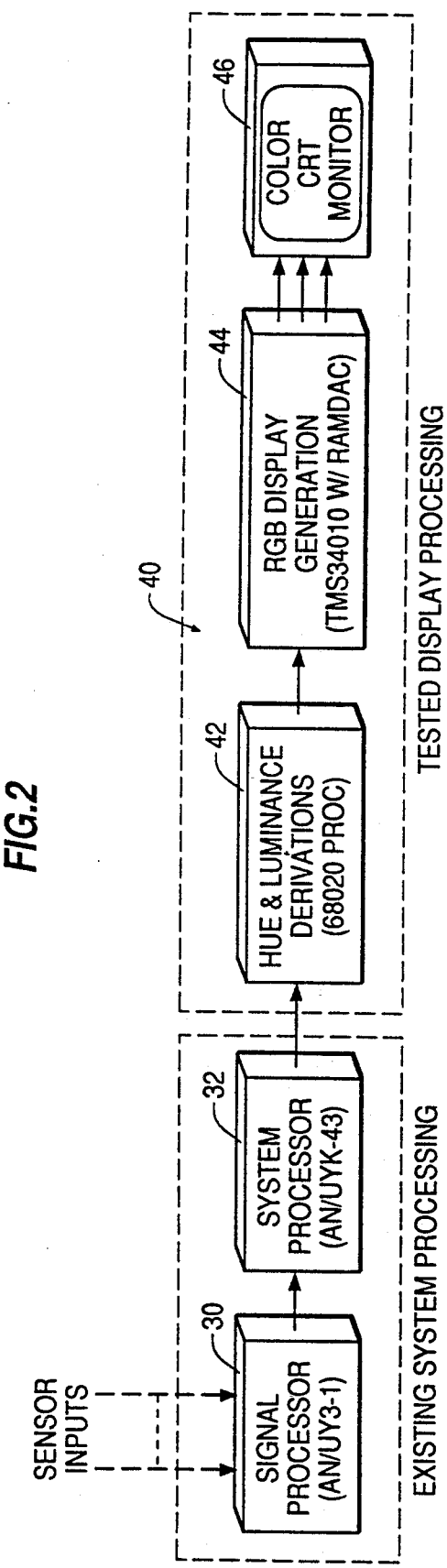
FIG. 2 is a block diagram of the architecture used by the invention to achieve the improved performance and test results.

Shown in FIG. 2 is the particular architecture for generating an additional dimension. The architecture diagram of the display system includes a system sensor processor 30 which processes the sensor signal and sends it to a general purpose computer 32. Computer 32 functions in the standard way of sonar processing to produce a B-scan monochromic display presentation. The computer sends amplitude information as a function of the X-Y data to the first part of the color processing display system 40. Within the color processing display system 40 is a microprocessor 42 which is used to extract additional information for the hue, W, axis. It then maps the information on the hue axis and the luminance axis separately to match the number of levels selected for each in the color table.

The present design combines the re-quantized levels for the W and Z axes into a single index for a one dimensional color array, a simplified version of the color table lookup. The disclosed embodiment contemplates the use of eight levels for each axis, although more or fewer might be appropriate for any given application. The graphics processor 44 does the usual task of moving the data into the refresh buffers of the display and accesses the attached RAM buffer containing the color table which generates the drive level for each of the primary CRT phosphors (red, green, blue) to produce the required pixel hue and luminance from the color index. The display components are commercially available and connected in a unique manner to produce a significant enhancement to the image viewed by the operator by providing the additional independent information dimension. From the CRT display generation, the color CRT monitor 46 is used to display to the operator W, X, Y and Z information including the extra dimension added to the sensor processed raster data.

Figure 3:
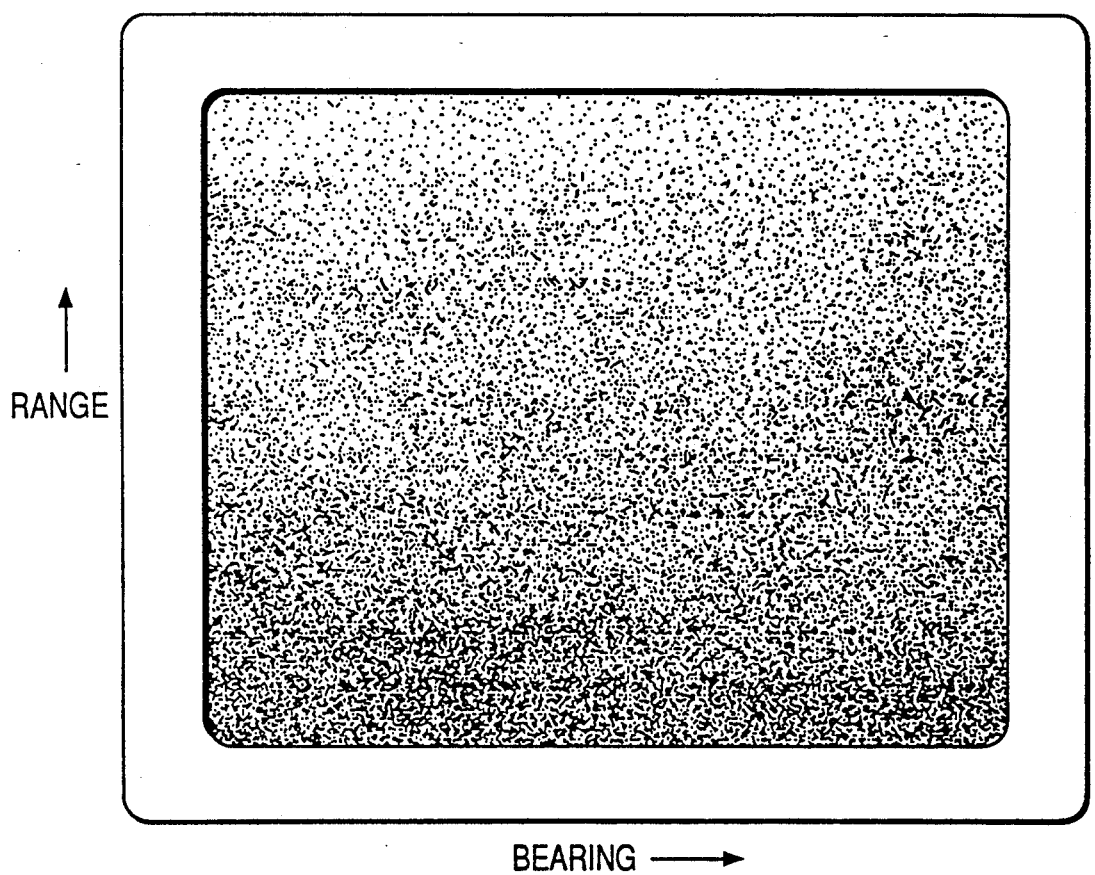
FIG. 3 is a typical active sonar B-scan display presented in the classic monochrome version.

A typical active sonar display is shown in FIG. 3. Range is along the vertical axis, and bearing along the horizontal axis. Adjacent columns of data are sonar returns from the same bearing from sequential echo ranging cycles. Each pixel's luminance level is encoded by the signal-to-noise estimate. The higher the signal-to-noise, the brighter the pixel. In addition to signal-to-noise ratio, most active sonar systems provide doppler estimates for each pixel. These doppler estimates are separately encoded to produce a hue proportional to the estimate. The hues are defined using saturated colors, so the operator can easily associate separate estimates from the target which are in the same neighborhood. Operator recognition of a target is made from a colorized display by associating pixels which have not only a higher than average luminance (signal-to-noise), but also a consistent hue (doppler).

On a color CRT, hues closely approximating saturated colors are obtained by using, at most, two color guns at a time, starting from red only, to red plus green, to green, to green plus blue, to blue. A successful application of this new technique employed eight hues using the above scale, starting with the red gun only (hue #1), then decreasing the levels of red and increasing the levels of green (hues #2, 3, 4), then to the green gun only (hue #5), and then increasing levels of the blue with some green (hues #6, 7, 8) to maintain a constant apparent luminance to the human eye. This color scale was modulated by a standard luminance scale of eight "gray shades" by using a table lookup to produce a total of 64 concurrent colors. This new color table method using saturated color and a modulating brightness scale is expandable to additional colors in each dimension, hue (W axis) and luminance (Z axis), independently. It accomplishes this while still allowing a recognizable and independent monotonic progression along the W and Z axes to any normally sighted person. The rows of the required color table are constant hue and the columns constant luminance. This is shown as element 22A-C in FIG. 1. The color gun levels used in the present invention are defined by the entries of FIG. 5. For easier user adaptation, the use of X and Y as position axes and the use of orthogonal Z axis as a luminance axis is kept as it has been for normal applications in the past. The fourth orthogonal axis, hue, is used to present additional information to aid in user visualization of images. The displays being discussed are not color images of physical surfaces, e.g., color vs. black and white photographs, but of artificial surfaces, e.g., temperature as a function of X, Y position, as in the case of infrared presentations. In these displayed images what is provided is a method for adding additional information, such as temperature gradient, while still preserving raw temperature as a function of X, Y position on the same image.

Figure 4:
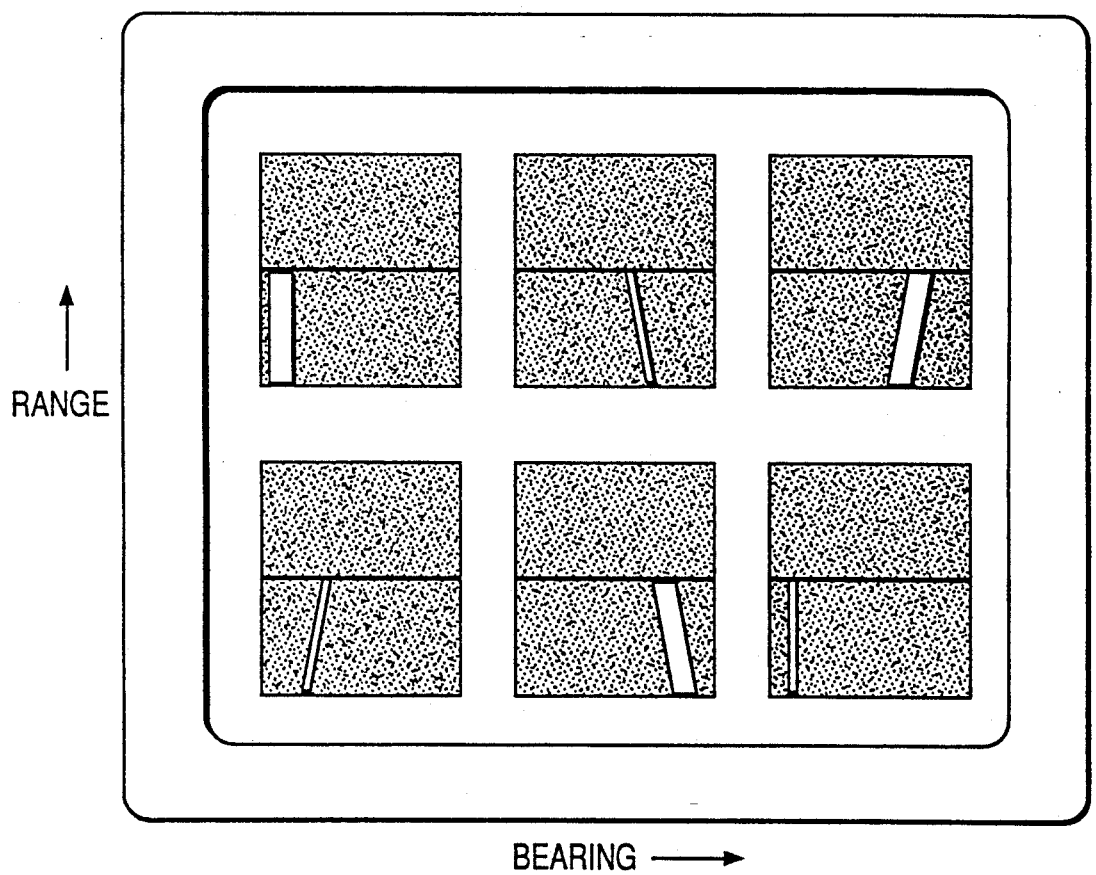
FIG. 4 is a typical passive sonar B-scan display presented in the classic monochrome version.

A typical passive sonar display is shown in FIG. 4. Time is along the vertical axis, and bearing is along the horizontal axis. Horizontal rows of pixels waterfall or move vertically downward, as each new row of data is produced and added to the display. Each pixel's luminance level is encoded by the signal-to-noise estimate produced by the sonar system's signal processor. A bearing rate estimate is obtained for each pixel using a Hough transform to select the best rate trajectory estimate over the previous time interval. In the present measurements, over 64 lines of display history along the time axis, were used to select the best rate hypothesis for each new pixel. As in active displays, a rate estimate is used to select the hue for each pixel. Each hue is a saturated color and employs the same color table strategy as that mentioned in the active sonar display. Operators can recognize targets by associating pixels along a linear trajectory hypothesis in the time/bearing space plotted on the raster data. With this invention, the associations utilize both signal-to-noise (luminance) and rate (hue), yielding faster and lower-signal-level detection than those obtained in a monochrome presentation using just signal-to-noise (luminance).

The colorization technique does not alter the geometry of the display. The pixel location and the axes of the display remain on the colorized display as a monochrome display for both the active and passive sonar displays. Luminance of the pixels still indicates signal levels as in a monochrome presentation. The hue of a pixel, applied as a result of the additional processing, represents the "best estimate" trajectory hypothesis. This allows the viewer of this enhanced image to link adjacent pixels from a moving emitter lying along a fixed trajectory hypothesis by hue and luminance, not just signal level, as is done with either monochrome or "false color" presentations, while still allowing the viewer to make the initial recognition decision.

This new technique applied to the imaging of a moving acoustic source (passive sonar) and doppler encoding (active sonar) has been shown by experiment in the present invention to yield at least a 1.5 dB improvement in the recognition performance. Detection theory attributes this result to the extra degree of freedom provided by the addition of an independent rate (color) cue to the usual, signal level (luminance) presentation of information. A minimum 25 percent improvement in operator recognition time was also measured.

Although a specific embodiment has been disclosed, it will be understood by those having skill in the art that changes can be made to that specific embodiment without departing from the spirit and the scope of the invention.

What is claimed is:

1. A method for adding an extra dimension to a color video display of a target comprising the steps of:
   receiving digital sensor input signals containing target information for video processing;
   generating hue and luminance values from the input signals, the hue value containing rate information of target motion;
   comparing the generated hue and luminance values to a stored lookup table of hue and luminance values necessary to provide proper human color perception or each pixel on therefore said color video display and out putting a digital signal containing normalized hue and luminance values;
   converting the digital signal to an analog signal; and
   displaying the analog signal containing an extra dimension on said color video display.

2. The method of claim 1 wherein only saturated colors are used in displaying the analog signal.

3. An apparatus for displaying an extra dimension on a color video display of a target comprising:
   means for receiving digital sensor input signals;
   means for generating hue and luminance values from the input signals, the hue value containing rate of motion information of the target;
   means for comparing the generated hue and luminance values to a stored lookup table to provide proper human color perception for each pixel on said color video display and outputting a digital signal containing normalized hue and luminance values;
   means for converting the digital signal to an analog signal; and
   means for displaying the analog signal containing an extra dimension on said color video display.

4. The apparatus of claim 3 wherein the display means uses only saturated colors.

5. A system for displaying an extra dimension on a color video display comprising:
   video signal processing means for processing digital sensor input signals for video display;
   means for generating hue and luminance values from the input signals, the hue value containing rate information for the color video display;
   normalizing means for comparing the generated hue and luminance values to a lookup table to insure proper human color perception for each pixel on said color video display and for outputting a normalized digital signal containing normalized hue and luminance values;
   means for converting the digital signal to an analog signal; and
   means for displaying the analog signal containing an extra dimension on said color video display.

6. The system of claim 5 wherein the display means uses only saturated colors.

* * * * *

UNITED STATES PATENT AND TRADEMARK OFFICE
CERTIFICATE OF CORRECTION

PATENT NO. : 5,280,344
DATED : Jan. 18, 1994
INVENTOR(S) : Witlin et al.

It is certified that error appears in the above-identified patent and that said Letters Patent is hereby corrected as shown below:

On the title page: Item [75]

Change inventors name : Kenneth A. Rohrer, Fairfax;

Signed and Sealed this

Fourteenth Day of June, 1994

Attest:

BRUCE LEHMAN

Attesting Officer          Commissioner of Patents and Trademarks